United States Patent [19]

Klass et al.

[11] 4,184,547

[45] * Jan. 22, 1980

[54] SITU MINING OF FOSSIL FUEL CONTAINING INORGANIC MATRICES

[75] Inventors: Donald L. Klass, Barrington; Sambhunath Ghosh, Homewood, both of Ill.

[73] Assignee: Institute of Gas Technology, Chicago, Ill.

[ * ] Notice: The portion of the term of this patent subsequent to Apr. 25, 1995, has been disclaimed.

[21] Appl. No.: 896,976

[22] Filed: Apr. 17, 1978

Related U.S. Application Data

[63] Continuation-in-part of Ser. No. 800,357, May 25, 1977.

[51] Int. Cl.$^2$ .................... C12B 1/00; C21B 43/22; E21C 41/10
[52] U.S. Cl. ........................................ 166/246; 299/7; 299/18
[58] Field of Search .................... 166/246, 266, 305 R; 195/3 H; 208/11 R, 11 LE; 241/1; 299/7, 10, 18

[56] References Cited

U.S. PATENT DOCUMENTS

| | | | |
|---|---|---|---|
| 3,185,216 | 5/1965 | Hitzman | 166/246 |
| 3,826,308 | 7/1974 | Whitney | 166/246 |
| 4,043,395 | 8/1977 | Every et al. | 166/268 X |
| 4,085,972 | 4/1978 | Ghosh et al. | 299/7 |

*Primary Examiner*—Stephen J. Novosad
*Attorney, Agent, or Firm*—Thomas W. Speckman

[57] ABSTRACT

A process for recovering underground fossil fuel deposits retained in an inorganic matrix wherein the deposit is contacted with an aqueous medium of anaerobic microorganisms for a time sufficient to produce particles of the deposit containing both the organic fossil fuel and inorganic matrix of a size capable of forming a slurry with the aqueous medium for pumping to the ground surface. At the ground surface, the particulates are separated from the aqueous medium of anaerobic organisms, the particulates further processed by efficient surface techniques to separate the organic carbon and hydrocarbon component from the inorganic matrix. The aqueous medium of anaerobic organisms is recycled to the underground fossil fuel deposit for further production of the slurry forming particles of the deposit. Spent inorganic matrix may be added to the aqueous medium of anaerobic organisms to provide solid support and nutrient for the organisms and to maintain the desired pH. Such use of the spent inorganic matrix provides a useful service for the waste from the organic carbon and hydrocarbon recovery process. The anaerobic organisms may also form gaseous hydrocarbons during contact with the underground fossil fuel deposit.

15 Claims, No Drawings

4,184,547

SITU MINING OF FOSSIL FUEL CONTAINING INORGANIC MATRICES

CROSS REFERENCE TO RELATED APPLICATION

This application is a continuation-in-part application of our copending application, Ser. No. 800,357, filed May 25, 1977, to issue as U.S. Pat. No. 4,085,972 on Apr. 25, 1978.

This invention relates to a process for recovering underground fossil fuel deposits which are retained in an inorganic matrix. This invention relates particularly to recovery of kerogen from oil shale and bitumens from tar sands.

Oil shale and tar sand deposits are found in various areas throughout the world and are potentially a source of extremely large quantities of hydrocarbon fuels. Oil shale is a rock generally of dolomitic marlstone inorganic mineral portion forming an inorganic matrix which strongly retains a cross-linked, high molecular weight organic material known as kerogen. Various methods for recovering useful hydrocarbons from oil shale have been proposed. Generally, the recovery of hydrocarbons from oil shales involves the use of heat and various upgrading techniques to provide both liquid and gaseous hydrocarbon products which are usable as fuels.

There have been proposals of processes for separation of the organic carbon and hydrocarbons from the inorganic matrix in situ in the underground deposit and other processes involving bringing the oil shale to the surface for treatment. It appears that economics and higher yield presently favor surface processing of the oil shale to obtain the organic hydrocarbons.

This invention is directed to a process of mining the underground fossil fuel deposit which is retained in an inorganic matrix by use of anaerobic organisms which produce particles of the underground deposit of a size capable of forming a slurry with an aqueous medium which may be pumped to the ground surface. The deposit, such as oil shale, is presented to the surface processing plant in small particulate form which is especially suitable for further processing such as retorting or solvent extraction techniques for the desired recovery of the organic hydrocarbon fraction.

According to the present invention, a portion of the inorganic matrix remaining after recovery of the organic hydrocarbons may be added to the aqueous medium recycle to the underground fossil fuel deposit. The addition of spent inorganic material to the slurry returned to the formation serves to dispose of the spent material and provides a solid support and a nutrient for the anaerobic organisms as well as for pH control in the underground deposit. The anaerobic organisms may also form gaseous hydrocarbons suitable for use as fuels during their contact with the underground fossil fuel deposit. Such fuels may be used directly for heat and energy in associated surface treatment processes. Thus, a process which may be operated on a continuous or intermittent basis is provided for the recovery of organic carbon bearing inorganic matrix in a form most usable for further processing to obtain the useful organic hydrocarbon components.

Prior methods of mining materials such as oil shale have utilized stricly mechanical methods of mining such as the physical breaking of the oil shale and mechanical conveyance of the broken oil shale to the surface. These mechanical methods are expensive, requiring considerable equipment and manpower. Further, the oil shale, after being brought to the surface, must generally be crushed mechanically to a small size for use as a feed stock for further processing. Other proposed methods of recovery include in situ mining techniques principally relating to the separation of the organic and inorganic components in the underground formation such as leaching the desired mineral as taught by U.S. Pat. No. 3,937,520, dissolving the inorganic matrix and recovering the desired hydrocarbons as taught by U.S. Pat. No. 3,915,234, or releasing the carbonaceous material as taught by U.S. Pat. No. 3,185,216. It is also known to utilize the carbonaceous material in situ in the underground formation, such as in the production of methane, as taught by U.S. Pat. Nos. 3,724,542 and 3,826,308. In the present invention, anaerobic activity is used in situ in the underground formation to break the underground structure into particle sizes which may be pumped to the surface as an aqueous slurry. The principal separation of the organic carbon from the inorganic matrix is performed by conventional techniques at the surface and the anaerobes together with at least a portion of the separated inorganic matrix recycled in an aqueous slurry to the underground formation.

It is an object of this invention to provide a process for in situ production of particles of an underground deposit containing both the inorganic matrix and organic component of a size capable of forming a slurry which may be pumped to the surface.

It is another object of this invention to provide a continuous or intermittent in situ mining process for fossil fuel containing inorganic matrices utilizing anaerobic organisms to break the underground deposit down to particle sizes capable of forming a slurry and to form gaseous hydrocarbons suitable for use as fuels.

It is yet another object of this invention to recycle an aqueous medium of anaerobic organisms to an underground fossil fuel deposit after separation of the particulates from the aqueous medium of anaerobic organisms and adding to the aqueous medium as a nutrient and solid support for the anaerobic organisms spent inorganic matrix resulting from surface processing separating the organic carbon and hydrocarbon component from the inorganic matrix.

The process of this invention uses anaerobic microorganisms in the underground fossil fuel deposit to form particulates in situ which may be formed into an aqueous slurry for pumping to the surface and further processing. The use of anaerobic microorganisms is especially suitable since they do not require free oxygen for the maintenance of their life. The anaerobic microorganisms used in the process of this invention are those which principally utilize inorganic materials as nutrients. One preferred embodiment of this invention also uses anaerobic microorganisms which produce gaseous hydrocarbons, principally methane, from the organic components of the shale oil deposit. The production of methane from kerogen of the oil shale by utilization of the carbon source in the kerogen as an energy source for anaerobic microorganisms has been described in U.S. Pat. No. 3,724,542. However, the prior art does not suggest use of the anaerobic microorganisms for formation of a pumpable slurry of both the organic and inorganic components of the underground deposits for more effective surface separation of the organic carbonaceous components. The gaseous hydrocarbons incidentally produced according to the process of the present invention are especially desirable to provide fuel for heat requirements of surface processes for the separation of the organic carbonaceous component from the inorganic material. While the principal objective of the process of this invention is the formation of small particles from the deposit by utilization of the inorganic portion of the deposit by the anaerobic microorganisms, mixtures of facultative anaerobic microorganisms may be used to both achieve the breaking into slurry size particles of the deposit and to produce hydrocarbon gaseous fuel for any desired use including for surface processing requirements. The gaseous hydrocarbons may be intermittently or continuously flushed from the deposit to surface storage or use. Any flushing gas which is non-reactive with the gaseous hydrocarbons and does not affect the microorganisms is suitable. For example, hydrogen containing gas, up to 30 to 40 mole percent may advantageously be used. The gaseous hydrocarbons formed may also be removed from the deposit by virtue of the pressure created by their formation, by floating out due to their low density or by a negative pressure created to remove the gaseous hydrocarbons.

Anaerobic microorganisms are desirable for use in the process of this invention since they are able to live in the underground formation without the need of supplying oxygen. Aerobic microorganisms do not accomplish the breaking into slurry size particles of the deposit necessary for the process of this invention. The anaerobic organisms used are those which utilize the inorganic matrix of the underground formation as a nutrient. Exemplary of suitable anaerobes include Clostridium, Pseudomonas, Escherichia coli, Methanobacterium, Methanosarcina barkerii, Methanoccocus vannielli and mixtures thereof. Such microorganisms may metabolize the organic component and require the inorganic component as a nutrient.

The anaerobic microorganisms are introduced into the aqueous slurry of spent inorganic matrix to obtain a high viable concentration. The concentration limit is principally governed by the necessity of maintaining a pumpable slurry. The concentration of anaerobic organisms in the aqueous slurry may be about 0.01 to about 25 wt. percent, about 5 to about 15 wt. percent being preferred. About 65 to 70 wt. percent solids is the maximum solids content of the aqueous slurry dependent upon the density and size range of the solids. The slurry must contain sufficient spent inorganic matrix to provide solid support and nutrient for the anaerobic organisms and to provide a pH in the slurry of about 6.5 to about 7.8.

The contact time of the anaerobic slurry in the fossil deposit is of sufficient time to provide particulates of the underground deposit of organic fossil fuel and inorganic matrix of size suitable for pumping to the surface as a slurry. Contact times longer than necessary to produce the particle sizes to form a slurry should be avoided. Suitable particle size is about 0.5 to about 50 mm diameter, about 1 to about 10 mm being preferred. Contact times of up to about 150 days are necessary when the anaerobic concentration is low and as short as about 10 days when the microorganism concentration is high. The slurry temperature is limited by the necessity to keep the water in liquid state and to assure the growth and life cycle of the anaerobic microorganisms. Mesophilic or thermophilic temperatures at the deposit face are suitable. The maximum desirable temperature is about 80° C., a formation ambient temperature of about 20° to about 80° C. is suitable, about 30° to about 60° C. is preferred. It is also desired that the water not contain more than about 15 wt. percent dissolved salts and preferably not more than about 5 wt. percent dissolved salts since the larger amounts of dissolved salts inhibit the growth of the organisms.

The process of this invention involves contacting the underground deposit with an aqueous medium of suitable anaerobic organisms. A hole is drilled from the ground surface into the deposit volume or an existing hole is used into which an aqueous medium containing anaerobic organisms is supplied to the face of the deposit while particulates from the deposit containing both the organic fossil fuel component and the inorganic matrix are removed from the deposit volume to the ground surface as a slurry for further processing. The aqueous slurry containing particulates of organic fossil fuel and an organic matrix together with the anaerobic organisms is pumped to the formation and to the ground surface by well known slurry pumping means. The pressure required is that necessary to move the slurry and to overcome gas pressure in the underground formation. The introduction of the aqueous medium containing anaerobic microorganisms to the deposit and the removal of the slurry, may be on a continuous basis or may be on pulsed or intermittent basis depending upon the rate of particulate formation.

When the aqueous slurry containing the microorganisms and particulates of organic fossil fuel and inorganic matrix arrive at the ground surface, the particulates must be separated from the aqueous medium of anaerobic organisms. This separation may be achieved by any suitable separation means, such as by gravity means of settling, flotation or filtration or a combination thereof.

The particulates are further processed by any suitable means to separate the organic carbon and hydrocarbon component from the inorganic matrix. The type of organic carbon and hydrocarbon recovery from the fossil fuel deposit is not critical to the process of this invention. It is an advantage of this invention, however, that efficient surface processing may be used. The spent inorganic matrix obtained after such processing is used in the process of this invention by addition to the aqueous medium of anaerobic organisms in an amount sufficient to provide the desired pH in the slurry and to serve as a nutrient and solid support for the microorganisms. The spent inorganic matrix nutrient is already in a particle size capable of forming a slurry and thus available to the organisms throughout the aqueous medium. Additional anaerobic organisms may be added to the aqueous medium to make up the desired concentration of organisms. The organisms may also be produced in situ by use of suitable inoculants such as municipal digested sewage sludge, anaerobic digester effluent and organic sediments or bottom muds from anaerobic zones.

The aqueous medium containing anaerobic organisms and spent inorganic matrix nutrient is then recycled to the underground fossil fuel deposit for production of particles of such deposit of a size capable of forming a slurry with the aqueous medium. The process is continued until the volume of the fossil fuel deposit is depleted and a new volume of fossil fuel deposit is then subjected to the same process.

The following examples are meant to illustrate specific embodiments of this invention and are not meant to limit the invention.

EXAMPLE I

Colorado oil shale containing 11.7 to 15.8 percent organic carbon and 19.87 percent volatile matter by weight and having more than 70 wt. percent particle size of about 2.0 to 2.8 millimeters in diameter was mildly mixed by a magnetic agitation bar in an aqueous slurry with facultative anaerobes provided by an inoculant of municipal digested sewage sludge for 45 days at 35° C. and a pH of 7.1. The oil shale particle sizes were reduced to 0.1 millimeters and less, and a gas containing 90 percent methane was produced at a yield of 2.5 SCF of methane per pound of oil shale volatile matter. This example shows the size reduction of the oil shale which takes place as a result of the anaerobic microorganism activity and the high methane content gas produced as compared to 55–60 percent methane content gas usually obtained.

EXAMPLE II

An aqueous slurry of anaerobic microorganisms provided by digested municipal sewage sludge and spent inorganic matrix from kerogen recovery from oil shale is pumped down a hole to an underground fossil fuel deposit. The slurry contains about 15 wt. percent anaerobes and about 30 wt. percent spent inorganic matrix which provides solid support and nutrient for the organisms and maintains the pH at less than about 7.0. The fossil fuel deposit temperature is about 40° C. and after a fossil fuel deposit contact time of 70 days a slurry is pumped from the deposit to the ground surface and contains particulates of the underground deposit of organic fossil fuel and inorganic matrix having an average particle size of about 10 mm. The articulates are separated for processing to separate the organic carbon component and the anaerobes together with a suitable amount of spent inorganic matrix are recirculated to the underground deposit as an aqueous slurry.

While in the foregoing specification this invention has been described in relation to certain referred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for recovering underground fossil fuel deposits retained in an inorganic matrix comprising:
   contacting said deposit with an aqueous medium of anaerobic organisms under mesophilic or thermophilic temperature conditions for a time sufficient to produce particles of said deposit of a size capable of forming a slurry with said aqueous medium and to produce gaseous hydrocarbons from the organic components of said deposit;
   pumping said aqueous slurry containing said organisms and particulates of organic fossil fuel and inorganic matrix to the ground surface;
   separating said particulates from the aqueous medium of anaerobic organisms, the particulates being further processed to separate the organic carbon and hydrocarbon component from the inorganic matrix;
   recycling said aqueous medium of anaerobic organisms to the underground fossil fuel deposit for further production of particles of said deposit; and
   removing said gaseous hydrocarbons from said deposit.

2. The process of claim 1 wherein said gaseous hydrocarbons are removed from said deposit by a flushing gas.

3. The process of claim 2 wherein said flushing gas is hydrogen containing gas.

4. The process of claim 3 wherein said hydrogen containing gas comprises up to about 30 to 40 mole-percent hydrogen.

5. The process of claim 1 wherein said recovered gaseous hydrocarbons are utilized for heat and energy in associated surface treatment processes.

6. The process of claim 1 wherein said recovered gaseous hydrocarbons are principally methane.

7. The process of claim 1 wherein said deposit is contacted with an aqueous medium of anaerobic organisms under thermophilic temperature conditions.

8. The process of claim 1 wherein spent inorganic matrix is added to said aqueous medium of anaerobic organisms to provide solid support and nutrient for said anaerobic organisms.

9. The process of claim 8 wherein said spent inorganic matrix provides a pH in said slurry of about 6.5 to about 7.8.

10. The process of claim 1 wherein said aqueous medium of anaerobic organisms and spent inorganic matrix nutrient is intermittently recycled to the underground fossil fuel deposit.

11. The process of claim 1 wherein the deposit temperature is about 20° C. to about 80° C.

12. The process of claim 11 wherein the deposit temperature is about 30° C. to about 60° C.

13. The process of claim 1 wherein the concentration of anaerobic organisms in the aqueous medium is about 0.01 to about 25 wt. percent.

14. The process of claim 1 wherein the fossil fuel deposit is oil shale.

15. The process of claim 1 wherein the fossil fuel deposit is tar sand.

* * * * *